(12) United States Patent
Buss

(10) Patent No.: US 8,769,604 B2
(45) Date of Patent: Jul. 1, 2014

(54) SYSTEM AND METHOD FOR ENFORCING ROLE MEMBERSHIP REMOVAL REQUIREMENTS

(75) Inventor: Duane Fredrick Buss, West Mountain, UT (US)

(73) Assignee: Oracle International Corporation, Redwood City, CA (US)

( * ) Notice: Subject to any disclaimer, the term of this patent is extended or adjusted under 35 U.S.C. 154(b) by 2037 days.

(21) Appl. No.: 11/434,327

(22) Filed: May 15, 2006

(65) Prior Publication Data

US 2007/0266006 A1    Nov. 15, 2007

(51) Int. Cl.
*G06F 17/00* (2006.01)
*H04L 29/06* (2006.01)

(52) U.S. Cl.
USPC ............................... 726/1; 707/705; 709/225

(58) Field of Classification Search
USPC ........... 726/1–2; 707/705, 783–785; 705/2–3, 705/51; 709/225
See application file for complete search history.

(56) References Cited

U.S. PATENT DOCUMENTS

| | | | | |
|---|---|---|---|---|
| 6,161,139 | A * | 12/2000 | Win et al. | 709/225 |
| 6,202,066 | B1 * | 3/2001 | Barkley et al. | 707/785 |
| 6,768,988 | B2 * | 7/2004 | Boreham et al. | 707/770 |
| 6,785,686 | B2 * | 8/2004 | Boreham et al. | 1/1 |
| 7,016,907 | B2 * | 3/2006 | Boreham et al. | 1/1 |
| 7,072,911 | B1 | 7/2006 | Doman et al. | |
| 7,397,922 | B2 * | 7/2008 | Gavrilescu et al. | 380/255 |
| 7,404,203 | B2 * | 7/2008 | Ng | 726/6 |
| 7,409,463 | B2 * | 8/2008 | Ramachandran | 709/246 |
| 7,461,395 | B2 * | 12/2008 | Ng | 726/1 |
| 7,546,633 | B2 * | 6/2009 | Garg et al. | 726/4 |
| 7,591,000 | B2 * | 9/2009 | Griffin et al. | 726/1 |
| 7,644,008 | B1 * | 1/2010 | Issa et al. | 705/9 |
| 7,650,633 | B2 * | 1/2010 | Whitson | 726/6 |
| 7,669,244 | B2 * | 2/2010 | Smith | 726/26 |
| 7,814,311 | B2 * | 10/2010 | Convery et al. | 713/153 |
| 7,831,570 | B2 * | 11/2010 | Sack et al. | 707/694 |
| 7,870,156 | B2 * | 1/2011 | Rutter et al. | 707/783 |
| 7,873,614 | B2 * | 1/2011 | Boreham et al. | 707/705 |
| 2002/0026592 | A1 * | 2/2002 | Gavrila et al. | 713/201 |
| 2004/0083367 | A1 * | 4/2004 | Garg et al. | 713/170 |
| 2004/0162894 | A1 * | 8/2004 | Griffin et al. | 709/223 |
| 2004/0162905 | A1 * | 8/2004 | Griffin et al. | 709/229 |
| 2004/0162906 | A1 * | 8/2004 | Griffin et al. | 709/229 |
| 2005/0021498 | A1 * | 1/2005 | Boreham et al. | 707/1 |
| 2005/0102389 | A1 * | 5/2005 | Liscano et al. | 709/224 |
| 2005/0125509 | A1 * | 6/2005 | Ramachandran | 709/220 |
| 2005/0138411 | A1 * | 6/2005 | Griffin et al. | 713/200 |
| 2005/0229236 | A1 * | 10/2005 | Devgan et al. | 726/1 |
| 2006/0089932 | A1 * | 4/2006 | Buehler et al. | 707/9 |
| 2006/0218394 | A1 * | 9/2006 | Yang | 713/167 |

(Continued)

OTHER PUBLICATIONS

Jansen, W.A., "Inheritance Properties of Role Hierarchies," Proceedings of 21st NIST-NCSC National Computer Security Conference, Oct. 6-9, 1998, Crystal City, Virginia.

*Primary Examiner* — Fikremariam A Yalew
(74) *Attorney, Agent, or Firm* — Marger Johnson & McCollom, P.C.

(57) ABSTRACT

System and method for enforcing role membership removal requirements are described. In one embodiment, the method includes, responsive to receipt of a removal request, performing a role evaluation of the removal request to generate a policy request; performing a policy evaluation of the policy request; generating a policy response in accordance with the policy evaluation; and enforcing the policy response.

7 Claims, 1 Drawing Sheet

(56) References Cited

U.S. PATENT DOCUMENTS

2007/0214352 A1* 9/2007 Convery et al. ............... 713/153
2007/0214497 A1* 9/2007 Montgomery et al. ........... 726/4
2009/0260056 A1* 10/2009 Garg et al. ...................... 726/1
2009/0320088 A1* 12/2009 Gill et al. ........................ 726/1

* cited by examiner

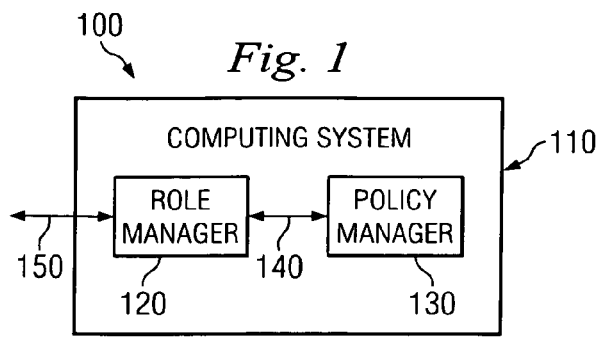
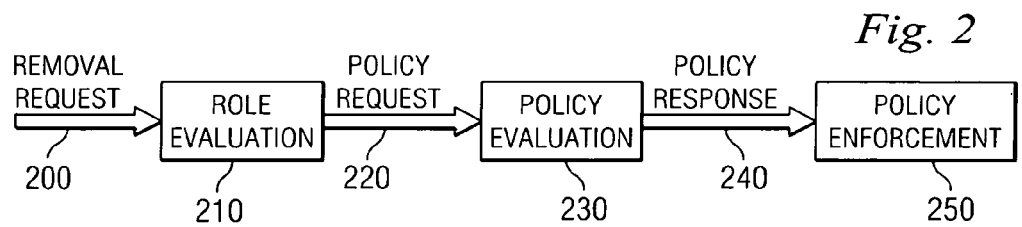
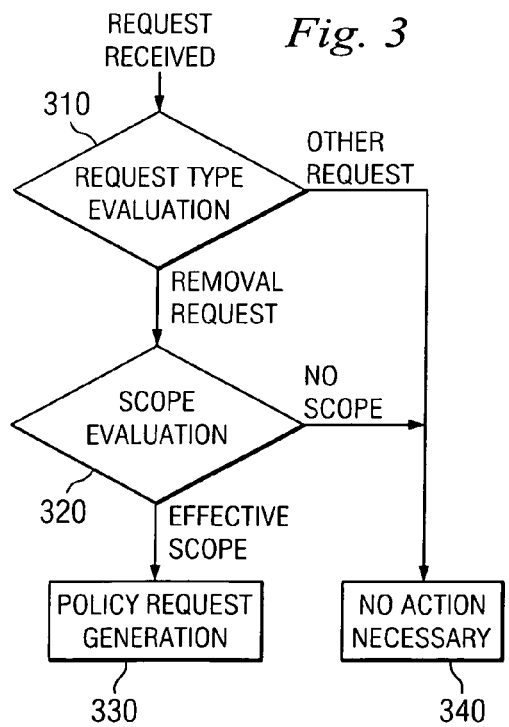
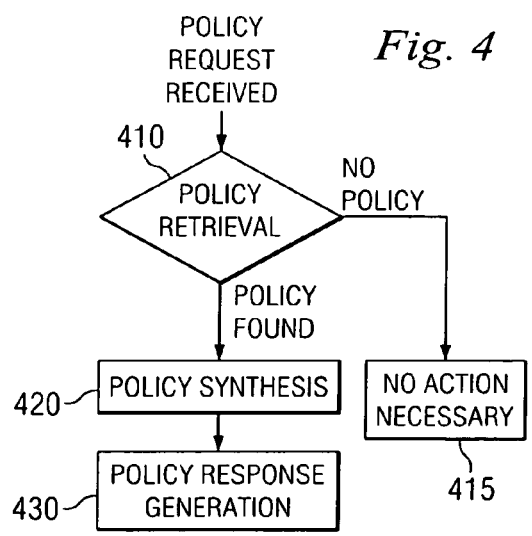

SYSTEM AND METHOD FOR ENFORCING ROLE MEMBERSHIP REMOVAL REQUIREMENTS

BACKGROUND

A role-based system is one in which identities and resources are managed by aggregating them into groups, or roles, based on job functions, physical location, legal controls, and other criteria. Role-based systems can be used to simplify access control as well as for administrative convenience. Role-based systems were developed from three general concepts: first, the use of groups in UNIX and similar operating systems; second, privilege grouping in database management systems; and third, separation of duties concepts.

As previously noted, the first concept from which role-based systems were developed is the group identifier in UNIX and similar operating systems. In those systems, some files and hardware capabilities are associated with a certain group. Adding a user to a group grants that user access to the files and hardware capabilities identified with that group. Revoking the user's membership in that group also revokes the user's access the group-shared files and functions.

The second concept from which role-based systems were developed, privilege grouping, works similarly. Instead of access to files, however, the database aggregates data-access permissions such as "CREATE TABLE," "SELECT [data]," and "INSERT [data]." By consolidating some of these permissions together into profiles, the procedure for granting and revoking access to read and change the data in the database is simplified.

The third concept from which role-based systems developed is the concept of separation of duties introduced in theoretical papers about security. Separation of duties is considered valuable in deterring fraud, since fraud can occur if an opportunity exists for one actor to fulfill multiple job-related functions. Separation of duties requires that for particular sets of transactions, no single individual is allowed to execute all transactions within the set. For example, financial controls in business settings often require that the person who signs a check be different than the payee on the check and that neither of those parties be associated with the audit of the checking account.

Separation of duties can be either static or dynamic. Compliance with static separation requirements can be determined simply by the proper allocation of transactions to roles followed by assignment of individuals to those roles. Compliance with the separation of duties concept is evaluated in advance, at the time of role creation and assignment. Dynamic separation of duties is more complicated. Procedures for dynamic separation of duties are required when compliance with requirements can only be determined during system operation. This allows for more flexibility in operations at the cost of higher complexity. Consider again the example of the financial controls of a business. A static policy could require that no individual who can write a check would ever be able to receive a check, and vice versa. This policy would be too rigid for real-world use. An alternative dynamic policy would allow a person to both write and receive checks, so long as that person was never allowed to sign any checks to herself or audit checks that she had received.

Role-Based Access Control (RBAC) brings together these three concepts to form a new security model. RBAC associates permissions and privileges (hereinafter collectively "permissions") with roles; each role is granted only the minimum permissions necessary for the performance of the functions associated with that role. Identities are assigned to roles, giving the people or objects associated with those identities the permissions necessary to accomplish job functions. This presents a flexible approach while still maintaining separation of duties concepts important to real-world security.

RBAC has been formalized mathematically by NIST and accepted as a standard by ANSI. American National Standard 359-2004 is the information technology industry consensus standard for RBAC, and is incorporated herein by reference in its entirety. A role can be regarded as a set of operations that an identity or set of identities can perform within the context of an organization. For each role, a set of operations allocated to the role is maintained. An operation is a transformation procedure plus a set of associated data items. In addition, each role has an associated set of individual members. As a result, RBAC provides a means of naming and describing many-to-many relationships between individuals and rights. An individual may at any moment be able to act in several roles. When an individual has multiple role assignments, that individual has the potential aggregated permissions of all roles to which that person belongs, subject always to separation of duties constraints. Therefore, the permission contours for each actor in a system can be unique without imposing excessive administrative overhead. Further, separation of duties can be enforced and audited on both a static and dynamic basis.

In addition to access control systems, role-based systems may be used as a convenient grouping or categorization tool within organizations. People, equipment, buildings, documents, and other concrete or abstract objects are can be put into groups for more effective management.

SUMMARY

In one embodiment, a method is provided for enforcing role membership removal requirements in a role-based system. The method includes, responsive to receipt of a removal request, performing a role evaluation of the removal request to generate a policy request; performing a policy evaluation of the policy request; generating a policy response in accordance with the policy evaluation; and enforcing the policy response.

BRIEF DESCRIPTION OF THE DRAWINGS

FIG. 1 is a block diagram illustrating a role-based system capable of enforcing role membership removal requirements in accordance with one embodiment.

FIG. 2 is a flowchart illustrating a method for enforcing role membership removal requirements in accordance with one embodiment.

FIG. 3 is a flowchart illustrating a method of performing role evaluation in accordance with one embodiment.

FIG. 4 is a flowchart illustrating a method of performing policy evaluation in accordance with one embodiment.

DETAILED DESCRIPTION

One embodiment includes a system and method for handling role membership removal requests, either on a real-time or delayed basis, and ensuring security, policy, and integrity constraints are maintained. In the context of this embodiment, "role" will be used to refer to either permission groups or roles, as appropriate. The term "policy" or "permission" will be used to refer to any policy, capability, condition, expression, or restriction which can be imposed within a system.

The term "identity" will be used to describe any non-permission object which can be associated with a role and does not necessarily refer to a person.

Referring to FIG. 1, an embodiment of a role-based system 100 includes a Computing System 110, a Role Manager 120, a Policy Manager 130 and Input/Output paths 140, 150. The Computing System 110 may comprise a single program or collection of programs on a computer, a special- or general-purpose computer with computing hardware, or a dispersed system such as a computer network. The Computing System 110 is responsible for maintaining the relationships and allowing communication between the different elements of the role-based system 100, as well as for enabling communication into and out of the system. It does this by providing an overall structure for the system 100 into which the other parts can fit and protocols by which those parts can talk to each other and to other components outside the system. The given structures and communication protocols may be explicit or implicit, physical or solely logical.

In one embodiment, the Computing System 110 maintains the relationship between different parts of the system 100 through a separation of different functional units into different code segments, functions, or modules. Communication between the different parts of the system takes place via the memory space in a computer. In another embodiment, communication into and out of the system takes the form of writing to or reading from disk, reading or writing to a network socket, or interacting with a peripheral. In another embodiment, the different parts of the system 100 are implemented as special-purpose integrated circuits, and their relationship and communication are defined by a series of busses going back and forth between the various components. In another embodiment, each part of the system 100 is a different computer, with the component computers interconnected via a network. In another embodiment, part of the system 100, such as the "Policy Response Enforcement" defined below, is provided by operator action. In another embodiment, the relevant structures are committees within a business structure defined by an organizational plan. Finally, aspects of these and other embodiments may be mixed. For example, parts of the system 100 may be connected by the network, other parts provided by an operator, and other parts only separated into different functions in a computer program.

The Role Manager 120 is responsible for execution of role changes, as will be described in greater detail below. Such role changes could include, for example, the creation, deletion, or modification of a role, changes to identity data, changes to role hierarchy, the association and disassociation of an identity with a role, and the association or disassociation of transaction capabilities with a role. The Role Manager 120 may be built upon various technologies, including, but not limited to, database systems, directory systems, files within a file system, rules engines, programming languages and XML documents. In other embodiments, the Role Manager 120 changes role information embedded within hardware, such as an FPGA, flash memory, or RAM. In another embodiment, role information is associated with and managed through the use of physical tokens, such as keys. Another embodiment uses digital tokens, such as passwords or certificates.

The role changes executed by the Role Manager 120 generally involve the translation of the mathematical principles applicable to role-based systems into a form that the Computing System 110 can use to act upon those principles. For example, a "role" as defined above is a grouping mechanism whereby certain identities are maintained in a defined relationship with certain permissions. In one embodiment, the Role Manager 120 accomplishes this grouping by representing each identity by a row in a database, representing each privilege by a row in the database, and then forming a computing rule which associates the identity row and the privilege row. In another embodiment, permissions are associated with bit fields, and the modification of a privilege involves the setting or the unsetting of a bit within the Computing System 110. It is specific duty of the Role Manager 120 to translate abstractions such as "permissions," "role," "identity" and "associate" into usable representations within the Computing System 110, and then to translate those representations back to an abstract form upon request.

The Policy Manager 130 is responsible for the association of policies with role changes, as will be described in more detail below, and the evaluation of policy constraints. It may also optionally be involved in policy actions. For example, such associations, evaluations, and actions could involve static or dynamic separation of duties requirements, logging or reporting requirements, role information lookups, cardinality checks, or other configurable conditions or actions to take place upon a role change. Further, the Policy Manager 130 may delegate portions of its responsibilities as appropriate.

The Policy Manager 130 may be implemented in various ways, including, but not limited to, triggers or stored procedures in databases, decision trees, neural networks, rules engines, or compiled or interpreted code. The Policy Manager 130 does not have to be exclusively machine or software-driven. In one embodiment, the Policy Manager 130 sends an email or other message to a human operator, who could respond with appropriate information or guidance. The Policy Manager 130 need not be deterministic; it need only evaluate a role change request according to some criteria and either take some action or return a response, as will be described in greater detail below.

As with the Role Manager 120, the Policy Manager 130 is a translation layer between logical processes and abstractions and usable representations within the Computing System 110. This translation has two aspects: first, the maintenance of policy representations, and second, the maintenance of instructions which describe how to act upon those policies in response to a request. For example, one policy might be the concept "don't allow people who write checks to sign checks." In one embodiment, the policy is stored as rows in two tables in a database—"people who write checks" and "people who sign checks." The instructions which describe how to associate these two tables are implemented as a series of instructions triggered to run by the modification of any entry in either table. In another embodiment, the information "people who write checks" and "people who sign checks" are lists written down on two sheets of paper. A standard procedure requires operator comparison of the two lists before approving any change to either list. Despite the use of a single constraint in the preceding examples, the Policy Manager 130 may evaluate policies having any number of constraints. For example, another embodiment uses computer constructs representing logical expressions, such as imperative or declarative statements, to store policy information. The rules governing those expressions are embedded within computer functions accessible to the policy manager; the functions are used to solve the system of equations, yielding a result.

For both the Role Manager 120 and the Policy Manager 130, a data store or stores within the Computing System 110 may be convenient. For example, a data store could hold policies and policy associations needed by the policy manager, identity and role information, associations between any parts of the system 100, or any other pertinent data. Should one or more data stores be convenient, they may be implemented in any means known in the art, including, but not limited to, relational, object, or other databases, LDAP stores or other directories, XML documents, or other files in a file system. A data store may involve storage in some sort of medium, such as a magnetic disk. It could also be implemented as an arrangement of transistors in a chip, or in some other chemical or mechanical form. However, a data store is not necessary to practice the invention. For example, an embodiment grouping physical resources into "active" and "standby" roles may use a sensor, such as a light sensor, to evaluate the activity in a certain room. In this simple embodiment, the sensor serves as the Policy Manager 130 without the need for storage or even "computation" in the traditional sense—the policy expression is expressed through the circuit design and the variable resistance to the electricity flowing through the sensor.

The Input/Output channels 140, 150, are responsible for coordinating and facilitating the transfer of information both within the Computing System 110 as well as between the Computing System 110 and anything outside the system 100. As with the other systems above, the Input/Output channels 140, 150, would be able to translate more abstract messages such as "remove identity A from group B" into a usable form suitable for transmission and interpretation by other parts of the system or by anything outside the system. For example, the Input/Output channels 140, 150, could translate "remove identity A from group B" into a series of waveforms that could be transmitted across a wire, such as an Ethernet cable or a computer bus. The receiver on the other side could translate those waveforms back into a form that retained the same semantic content as before. In another embodiment, a higher-level encoding of the information to be transmitted, such as a written description, is sufficient. What constitutes a usable form varies between embodiments and within an embodiment depending upon the requirements imposed by different parts of the system.

The relationship between the system of FIG. 1 and the method of FIG. 2 could be analogized to the relationship between software and hardware in a computer. The method of FIG. 2 works almost exclusively with abstractions—roles, privileges, identities, policies, etc. Those abstractions would be the "software" part of the relationship—the expression of logic within a system. The system described in FIG. 1 would be the "hardware" part of the relationship—translating the abstractions used within FIG. 2 into entities which can be acted upon by the Computing System 110. Because this translation between usable and abstract representations can vary between different embodiments, the amount of abstraction necessary or available to express a concept may similarly vary.

Turning now to FIG. 2, initiation of a role membership removal evaluation and response begins with receipt of a Removal Request, represented in FIG. 2 by an arrow 200. The Removal Request 200 may originate from any source, including, but not limited to, a person, a mechanical or electrical switch, or a hardware or software agent. The Removal Request 200 may be alone, or it may be part of a larger group of requests being executed as a result of an iterative, parallel, or recursive process.

The Removal Request 200 may be a request for the disassociation of an identity from some role or roles, the disassociation of some privilege from some role or roles, the disassociation of a policy with some role or roles, or a change in role hierarchy. In one embodiment, the Removal Request 200 is a string including such information as an identity specifier, a role specifier, and an action specifier. Another embodiment uses a privilege matrix within a SQL database to implement roles, privileges, and identities; the Removal Request 200 is represented by a SQL string updating the privilege matrix.

In another embodiment, the Removal Request 200 is represented by a series of clicks and drags from a mouse in within a GUI environment. An on-screen visual box represents a role; the privileges and identities associated with that role are represented by icons within that box. The combination of a click on some element within that box, and dragging it outside the box, constitutes a removal request.

In another embodiment, the Removal Request 200 is represented by a button press, a function call, or a HTTP GET for a certain page in a web application.

In another embodiment, the Removal Request 200 would not initially be considered a removal request, but other restrictions or policies within the system force the system to treat the request as a Removal Request. For example, assume an embodiment in which there are two mutually exclusive roles, r1 and r2, and an identity belonging to r1. The request to add the identity to r2 could also be interpreted as a request to remove the identity from r1. Finding and identifying these sorts of issues is Role Evaluation, represented by the box 210 on FIG. 2.

The Role Evaluation 210 is responsible for deciding whether this is an action which might have a removal policy associated with it. This evaluation also determines which identities, roles, privileges, or other logical objects would be affected by a request. For example, one embodiment traps every function call which updates a table in a database, but does not trap any function calls which only read information from the database. Another implementation looks at the total roles assigned to all identities before a change, precomputes the roles which would be available after the change, and then intervenes to check for a policy should the number or composition of roles available to any person change.

In another embodiment, the Role Evaluation is not necessarily synchronous with the request. For example, the Removal Request 200 arrives, and possibly is acted upon, prior to the Role Evaluation 210. In this case, the Role Evaluation 210 takes place post-hoc, and the current state of the roles is compared with some past state to determine if a Policy Request 220, as discussed below, is necessary. In another embodiment, Role Evaluation 210 takes place based simply upon reviewing activity logs, as opposed to inspecting the current state of the system.

The Role Evaluation 210 is equally applicable to static and dynamic role membership policies. In the case of dynamic role evaluation, the current roles and context are computed according to the current set memberships. Once the current memberships are determined, the evaluation proceeds. Similarly, Role Evaluation 210 may need to take into account hierarchical role relationships, as defined in the NIST standard, nested groups, or other role aggregations. In some embodiments, restrictions on role removal for descendants could apply to ascendants, and vice-versa. Nested group memberships and other aggregations can also implicate role removal policies.

FIG. 3 illustrates a flowchart of one embodiment of a method for performing the Role Evaluation 210 of FIG. 2. In step 310, in response to a request, such as the Removal Request 200 of FIG. 2, a request type evaluation is made. In the illustrated embodiment, the type of the request is not known until the request is received and interpreted in some fashion. However, this feature is not common to all embodiments; in another embodiment, for example, the type of the request is known via the method of making the request or the channel by which the request is received.

In one embodiment, the request type evaluation is performed by confirming the presence of key words or command sequences in the received request. In another embodiment, the type is revealed by examining the object targeted by the received request. In a third embodiment, the type is revealed by noting the channel by which a request is received. For example, an embodiment which exposed request functionality via URIs may determine the type of request based upon the URI invoked. In another embodiment, the request type evaluation performed in step 310 is performed by an outside operator; the received request is submitted to the operator and the operator returns an appropriate evaluation.

Moreover, the request type evaluation of step 310 is not restricted to the received request only, but may also involve outside or implied factors. In one embodiment, noted above, there exist two mutually exclusive roles and an object assigned to one of the roles. The request type evaluation of step 310 notes the role membership removal implied by the add role instruction, and proceeds accordingly. The request type evaluation of step 310, like the entire process illustrated in FIG. 3, takes into account as little or as much information is necessary to process a received request; different embodiments may use "shallow" or "deep" analysis without straying from the concepts described herein.

Upon completion of step 310, there are two possible results. Either the received request is a removal request or it is another type of request. If the received request is a removal request, execution proceeds to step 320, in which a scope evaluation is performed. The scope evaluation performed in step 320 is used to determine if the removal request will have any effect; that is, whether the removal request has effective scope. For example, assume an embodiment in which role information is stored in a SQL database. The scope evaluation step 320 takes the form of a SELECT against the database, and an inspection of the result tuple. A tuple which includes matching rows signifies that the removal request will cause some change in role information; i.e., has effective scope. If it is determined in step 320 that the removal request has effective scope, execution proceeds to step 330, in which a policy request is generated. An empty result tuple signifies that no role information will be changed by the request; that is, the removal request has no scope.

If it is determined in step 310 that the request type is an other request or if it is determined in step 320 that the removal request has no scope, execution proceeds to step 340, in which execution terminates, as no role removal-related action by the system is necessary. It will be recognized, however, that other embodiments may take some action based on a determination that the received request is an other request. Further, the termination of role removal-related processing does not necessarily terminate the normal processing of other requests.

The policy request generation step 330 may take many forms. In one embodiment, the generation is accomplished by one or more function calls. In another embodiment, the generation is accomplished by creating an XML document describing the role changes. In another embodiment, the generation is accomplished by creating a logical expression describing the changes. In general, the type of the Policy Request 220, described below, will control the means used to generate that request.

Returning to FIG. 2, if the Role Evaluation 210 determines that the Removal Request 200 is likely actionable, then a Policy Request 220 is issued as a result of the Role Evaluation 210. The Policy Request 220 clearly specifies which logical objects—roles, groups, identities, etc., are involved in the removal. In one embodiment, a specific command format is used to delineate the removal. This format is expressed, for example, as the textual message "REMOVE (identity) FROM (grouping)."

Another embodiment expresses the Policy Request 220 as an XML document transmitted over a network, to facilitate having a remote Policy Manager 130. Another embodiment involves a function call or table lookup. In any case, the Policy Request 220 specifies the object(s) involved in the removal as well as any pertinent relationship information. However, there is no need for this information to be explicit within the request if the same information can be conveyed implicitly.

Upon reception of the Policy Request 220, the Policy Manager 130 engages in Policy Evaluation, denoted in FIG. 2 by the box 230. The Policy Evaluation 230 is responsible for determining which, if any, of a number of policies are relevant to the Removal Request 200. This is often referred to as policy location, or finding the applicable policy set. In one embodiment where the Policy Request 220 is an internal table lookup, the Policy Evaluation 230 is a pointer to relevant policy expression(s) stored by the Policy Manager.

In another embodiment, multiple policies correspond to a certain Policy Request 220. For example, the Request "remove Bob Jones from role 'employee,'" has policies associated with it, which expressed in English, correspond to, "remove Bob Jones' access from the employee's shared drive," "remove Bob Jones' pay," and "notify human resources to hire another programmer." The Policy Evaluation 230 examines the circumstances and may return more than one policy. Not all policies may be applicable or enforced at any given time; the Policy Evaluation 230 may return a list of all policies or only appropriate policies.

In an alternative embodiment, policy statements are aggregated into a single policy statement which may be interpreted by the Computing System 110. For example, assume an embodiment in which policies are represented as bit fields in memory. In this embodiment, Policy Evaluation 230 is implemented as logical instructions, like "AND" or "XOR," across multiple bit fields. This creates a composite bit field representation of the compound policy expression. However, the exact details of such operations would not necessarily need to be known by the abstract processes evaluating the policies; as noted above, the function of the Policy Manager 130 is to translate between usable and abstract representations such that the operations carried out correctly reflect the abstract policy.

In another embodiment, all or portions of the Policy Evaluation 230 may be performed by an operator outside the system 100. For example, a manager terminating Bob Jones' employment may have the appropriate policies presented on the manager's computer screen. The manager then decides which policies to apply by clicking the appropriate checkboxes on the screen.

In an alternative embodiment, policies are grouped with the applicable roles and identities or associated with parts of the role hierarchy. The applicable policies are located by inspecting the hierarchy itself as well as the identity to be removed—policies associated with a descendant role may need to be applied if changes are made to an ascendant role. For example, assume an embodiment in which the administrators want to enforce the concept of least privilege by defining separate roles for each administrative task. To maintain necessary functionality, this embodiment maintains a policy that there exists at least one identity in each task-based role. Further assume all these roles have a common ascendant role, and an identity in the ascendant role is therefore able to perform all administrative tasks. A removal request affecting an identity in the ascendant role would need to take into account the policies associated with the descendant task-based roles. By examining the role hierarchy in response to the ascendant role removal, the descendant policy requirements are located and integrated into the Policy Evaluation 230.

FIG. 4 illustrates a flowchart of one embodiment of a method for implementing the Policy Evaluation 230 of FIG. 2. In step 410, in response to a policy request, such as the Policy Request 220 of FIG. 2, a policy retrieval is performed. The policy retrieval step 410 may take many different forms. In one embodiment the retrieval is implemented as a lookup within an object or SQL database. In another embodiment, the retrieval is implemented as a neural network in which probabilities are used to determine which policies are relevant. In another embodiment, the retrieval is implemented by querying an operator as to which policies are pertinent. Any embodiment may return no policies, one policy, or many policies.

In some embodiments, the policy retrieval step 410 may not exist or may be implicit. For example, one embodiment implements the retrieval by having variable resistance components in an electric circuit. The policy request, implemented as the activation of the circuit, is forced into a branch of the circuit by the variable resistance component. By preventing or allowing activation of circuit branches, the correct policy is implicitly chosen.

If no applicable policy is found in step 410, execution terminates in step 415, as no action need be taken by the system. In other embodiments, action may be taken upon the finding of no applicable policy in response to the policy retrieval step 410. If an applicable policy is found in step 410, execution proceeds to step 420, in which a policy synthesis is performed.

The policy synthesis step 420 combines the applicable policies found in step 410. For example, assume an embodiment in which the default policy, expressed in English, is "if an identity is removed from the role 'employee,' send an email to the system administrator." Further assume the existence of the policy "do not send email to employees on vacation." Finally, assume that the system administrator is on vacation when an employee is terminated (removing the employee from the applicable role). In this situation, the functions responsible for the policy synthesis step 420 note both policies, retrieve the applicable fact that the administrator is on vacation, and derive a policy statement "do nothing," allowing the two policy statements to cancel each other out. In another embodiment, the functions derive a policy statement "send an email to the assistant system administrator," effectively creating a new policy. In a third embodiment, the functions derive a policy statement "send an email to the system administrator" by selectively disregarding the second policy statement. In a fourth embodiment, the policy synthesis incorporates an intermediate result to resolve indeterminacy in the synthesized policy statement. This intermediate result may contain action statements, such as "appoint an acting system administrator," which are carried out before processing returns to the policy synthesis engine. When the policy synthesis engine is engaged again, the result is no longer indeterminate; in this example, the appointment of the acting system administrator allows the original policy statements to come to the conclusion "send an email to the system administrator." Despite the use of only two policies and one piece of information in the previous examples, the policy synthesis step 420 may encompass an arbitrary number of policies and pieces of information. Similarly, a policy synthesis step may use an arbitrary number of intermediate results to formulate a policy statement.

After the policy synthesis step 420, execution proceeds to step 430, in which a policy response generation step is performed. This step may take many forms. In one embodiment, the step 430 is accomplished by one or more function calls. In another embodiment, the generation is accomplished by creating an XML document describing the policy statement. In another embodiment, the generation is accomplished by creating a logical expression describing the actions. In general, the type of the Policy Response 240, described below, will control the means used to generate that request.

Returning to FIG. 2, the result of the Policy Evaluation 230 is the generation of a Policy Response, represented in FIG. 2 by the arrow 240. The Policy Response 240 is a list of actions, possibly empty, which actions correspond to the abstract policies. The Policy Response 240 may be as simple as an "allow" or "deny" flag, but could also involve any other action or condition expressible within the policy framework. For example, the policy response may be "send an email to an administrator," "log this action," "make a change to another role," "sound an alarm," or any other action, including the action "do nothing." Further, the policy response may involve any number of these responses together, such as "log this action, deny, and sound an alarm."

The Policy Response 240 allows many different embodiments. In one embodiment, for an example, the abstract policy "notify human resources about employee termination," is represented by a Policy Response 240 containing the command "email," the address "human_resources@company.com," and an email template "employee_termination_report." In other embodiments, it is represented by a list of pointers to functions or by a specially formed XML document. The Policy Response 240 may be represented by anything capable of conveying the correct meaning.

Further, it is not necessary that the Policy Response 240 be oriented toward only one recipient. One embodiment, for example, has a singular policy response with portions of that response addressed any or all of the Policy Manager 130, the Role Manager 120, the individual which initiated the Removal Request, and multiple outside systems. Each of these entities may receive either all of the response or only the pertinent portions. Further, there is no requirement that different parts of the Policy Response 240 be synchronous.

In another embodiment, the Policy Response 240 is implicit. For example, assume an implementation where a certain removal request is temporarily blocked; one implicit response would do nothing and allow the original response to go through.

The accumulated reaction to the Policy Response 240 is Policy Response Enforcement, denoted in FIG. 2 by the box 250. As noted above, the Policy Response 240 may be addressed to many different actors, both within and without the Computing System 110. In one embodiment, Policy Response Enforcement 250 is the creation of a log, noting the time when a certain action was accomplished. In another embodiment, Policy Response Enforcement 250 involves the calling and the subsequent execution of a function to allow a role membership change by the Role Manager 120. Another embodiment involves returning a message to the individual requesting the change, reporting whether the initial request was successful or not. Other embodiments send email, update databases, and invoke web services. Policy Response Enforcement 250 may involve doing nothing, a single action, or a combination of actions.

Different embodiments of this system are possible depending on how role membership is expressed, which objects are allowed to participate in roles, what those objects represent, what "role membership" is interpreted to mean. Embodiments may vary depending on a what level of integration exists within the role membership system and the accessibility of outside functions and data repositories.

Common to many embodiments is the concept of enforcement points. Enforcement points are points in the execution of a role change where it is determined a) whether the operation will be performed as requested, b) whether the operation will fail, or c) whether the operation will be transformed. Alternatively, these points are a system entity which performs access control, by making decision requests and enforcing authorization decisions. The concepts described here do not place any inherent restrictions or make any assumptions about the complexity of the decisions or actions which are permitted at enforcement points. Some embodiments may have simple rules, such as "the cardinality of members in a role must be >=1." Other embodiments might allow complex expressions, including expressions which check or modify values in the operation itself, in membership records, in the cardinality of roles, in internal or external data stores, and in external systems.

Many different embodiments use this concept of enforcement points. For example, assume an embodiment in which the Policy Manager 130 understands and has access to identity and role definitions and is substantially integrated with the Role Manager 120. An enforcement point exists right before role information is changed. As role information changes are requested, the Policy Manager 130 follows the method illustrated in FIG. 2, interposing itself at the identified enforcement point and ensuring that the modification is permitted before the modification occurs. The Policy Manager 130 can also interpose itself as role information changes are requested for the ascendants and descendants of a particular role; sometimes Policy Response Enforcement may be needed because of changes in the upstream or downstream context of a role.

However, the concept of enforcement points is not essential to create an embodiment of the invention. Further, enforcement points, should they be used, do not have to be "inline" with the original operation. For example, it is equally valid to have role membership removal requirements which are executed only periodically, after the actual removal has been accomplished. In that case, the "deny progress" action may be unavailable, but actions taken after the fact, such as "revert" or "moderate," can still effectively exercise a policy. In one embodiment, a role associates computers and printers in a certain location. Site policies monitor and control the printing allowed from each computer. With the advent of wireless networking, it is not desirable to have immediate revocation ("enforcement") of printing capability as soon as a computer is removed from its group (the local network). Rather, a periodic sweep to enforce such policies every couple minutes is preferable.

It will be recognized that traditional role-based access control systems presume an aggregative permission model. Each role holds permissions, and identities acquire those permissions through assignment to the respective roles. The extent of the permissions given to an individual is constrained by static and dynamic separation of duties concepts as well as the general principle of least privilege. In theory, an identity should not be able to aggregate a permission that would violate the separation of duties concept. In the event of a mistake, the principle of least privilege serves to contain the privilege leak and thus maintain some constraint upon the object associated with that identity.

One difficulty with the above is that real-world permissions are not always additive in nature. For example, one example of a role would be a "monitored computer" role, in which the "permission" added by the role is, in effect, a restriction. Such a role might be used to enforce "Chinese walls" within financial organizations separating the analysts from the brokers. Alternatively, such a role might be used to enforce restrictions on the dissemination of confidential information. In these, as well as other situations, it is impractical to have a purely aggregative permission model, as the variety of allowable choices would be too big or too fluid to realistically maintain each permissible choice as an additional permission. For just one example, the list of internet websites where employees might allowably go would be too large and too fluid to maintain; even the largest search engines acknowledge that they only include a fraction of all the internet sites within their index. Maintenance of a complete "allowed sites" index would be a substantial security cost with little comparative gain. On the other hand, it is much easier to maintain some sort of restrictive policy, such as "do not go to any sites on the non-allowed list," or "monitor all sites that this individual actually visited." These are "negative permissions."

Because restrictive roles, or roles that are associated with negative permissions, are more efficient and maintainable than aggregative roles for certain problems, restrictive roles are used in real life situations. However, because restrictive roles turn the access control model on its head, some fundamental assumptions of the model can be violated unknowingly when identities are removed from roles.

Mathematically, role-based systems can be described as a series of operations on sets. These sets represent aggregations of permissions by an identity holding a role. However, the traditional model is insufficient in the case where there exists a transaction which is disallowed under some set of roles, but allowed under a subset of those roles. This is the "negative permission" case, in which the extent of actions permitted under a set of privileges is in some sense smaller than the extent of actions permitted by a proper subset of those privileges.

Referring again to the system in FIG. 1 and the method in FIG. 2, an embodiment of the system employing the method described would allow privilege escalation via negative permission removal to be detected and handled. For example, assume that an embodiment of the Computing System 110 is implemented in a publicly traded company in which roles correspond to different functions within the company. Some roles in that company must be treated specially under federal oversight laws such as Sarbanes-Oxley. Assume further that a Removal Request 200 is received by the Role Manager 120 to request that a person of interest under Sarbanes-Oxley be removed from the "monitored desktop" role with which that individual is associated.

In one embodiment, the Role Manager 120 is implemented on a directory store, such as an LDAP database, Novell eDirectory, or Microsoft Active Directory. Assume these directories allow the imposition of "triggers" for certain actions. The Role Evaluation 210 is implemented as a trigger or triggers on role membership removal. This trigger formulates a Policy Request 220, implemented as a remote function call (on Input/Output channel 140) to another program serving as the Policy Manager 130. The Policy Manager 130 implements the Policy Evaluation 230 as an internal decision tree, to which the Policy Request is an input. The decision tree narrows down the possible policies by checking the status of the affected identity, the person making the request, preprogrammed decisions, and other criteria. One of the criteria evaluated in this context could be the number or composition of transactions available to the individual both before and after the requested change. An inspection of the transactions available after the change would indicate that this was a role associated with negative permissions. The Policy Manager 130 then assembles the Policy Response 240 as a series of XML-RPC commands (on Input/Output channels 140, 150) both back to the Role Manager 120 as well as to other outside programs. Policy Response Enforcement 250 takes place as the commands to the Role Manager and the outside programs are executed. For example, the Role Manager 120 could deny the Removal Request 200; the person making the request could be notified that the request was denied; and an external logging program could record the attempt in a log on disk.

Another difficulty with prior art implementations of role-based systems has to do not with privilege escalation, but with accidental privilege removal. Returning again to the mathematical description above, the total privileges available to a system might be reduced if all subjects capable of authorizing a certain action were removed from the authorizing role r. Each role has a set of associated identities, and a subject can execute a transaction if the subject has selected or been assigned a role. However if the cardinality of members in a role is zero, then nobody is able to perform that function. This is the "system privilege removal" case; the total number of transactions available to the system as a whole has decreased by the number of transactions exclusively available to role r.

For example, assume a role-based system exactly corresponding to UNIX group identifiers. All authority has been removed from individual identities (such as the root user), but has been reallocated to an "administrators" group. Assume further that the Role Manager 120 receives a Removal Request 200 to remove a former administrator—in this case, the last person in the group, from the administrators group.

In one embodiment, the Role Manager 120, implemented as the "useradd" program, receives the request to remove the last person from the administrators group. The program engages in Role Evaluation 210 to determine the type of request. In this case, the type of request would be "remove from group." The useradd program (as the Role Manager 120) could use a calling convention (the Input/Output channel 140) to make a function call (the Policy Request 220) to the Policy Manager 130, implemented as a function within the useradd program. The Policy Manager 130 engages in Policy Evaluation 230 by opening up the "administrators" group record and determining that there is only one current administrator. The Policy Manager 130 then returns a Policy Response 240 by first calling a function which adds the president of the company to the administrators group, then by allowing the original Removal Request 200 to succeed. The execution of these functions is the Policy Response Enforcement 250.

Finally, the ability to associate policies with removal requests not only allows handling of the cases described above, but also allows policy-driven responses to "normal" removal requests which do not implicate the amount of privileges available to the system or any identity within the system.

In another embodiment, given a similar situation to the "administrators" group described above, the Role Manager 120 and Policy Manager 130 may be compiled together into a program that is run periodically. Assume a situation in which an administrator was already removed. In this case, the Role Evaluation 210 determining that this was a removal request would happen after the last administrator was removed. The Role Manager still makes a Policy Request 220 to the Policy Manager 130 portion of the program. After a similar Policy Evaluation 230 to the one described above, the Policy Response 240 applies post-hoc remedies and takes other actions. For example, one aspect of a Policy Response 240 might be to reverse the change; another might be to "send a message to Human Resources to advertise for a new administrator." The reversal of the removal or the sending of the email brings the System 100 back into a compliant state, constituting Policy Response Enforcement 250.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A computer-implemented method for enforcing role membership removal requirements in a role-based system, the method comprising:
responsive to receipt of a removal request, performing a role evaluation of the removal request to generate a policy request, wherein the performing a role evaluation is executed by a computer-implemented role manager, and the policy request is associated with the removal request;
performing a policy evaluation of the policy request;
generating a policy response in accordance with the policy evaluation; and
enforcing the policy response, wherein the policy response is responsive to the removal request and includes doing nothing or doing at least one action;
wherein the performing a role evaluation, performing a policy evaluation, generating, and enforcing are all performed by a computer and further comprises checking for applicable conditions based on a role relationship, wherein the relationship is defined by at least one of a nested group and an aggregation.

2. The method as recited in claim 1 wherein the performing a role evaluation comprises checking for at least one of identity information changes affecting role membership, changes in role relationships, negative permission conditions, system privilege reduction conditions, and arbitrary user-supplied conditions.

3. The method as recited in claim 1 wherein the performing a policy evaluation is executed by a computer-implemented policy manager.

4. The method as recited in claim 1 wherein the performing a policy evaluation comprises at least one of retrieving an applicable policy, combining multiple policy statements, forming a new policy statement, selectively enforcing a policy statement, and forming a policy statement using an intermediate result.

5. The method as recited in claim 1 wherein the generating a policy response comprises at least one of doing nothing, formulating a command, creating a document, calling a function, calling an external system, describing a role information change, describing a policy change, and requesting a procedure.

6. The method as recited in claim 1 wherein the enforcing a policy response comprises at least one of doing nothing, allowing an action, denying an action, transforming the removal request, transforming the policy request, reporting a status, creating a record, executing a function, calling an external function, calling an external system, changing role information, changing a policy, performing a procedure, and effecting a user-specified procedure.

7. A system for enforcing role membership removal requirements in a role-based system, the system comprising:
- means for managing role information,
- means for associating at least one policy with the role information,
- means for receiving a removal request related to the role information, the policy is associated with the removal request;
- means for enforcing at least one policy in response to the removal request, including doing nothing or doing at least one action;
- means for evaluating a removal request by checking for applicable conditions based on a role relationship, wherein the relationship is defined by at least one of a nested group and an aggregation;
- means for generating a policy request; and
- means for evaluating at least one policy in response to the policy request.

* * * * *

UNITED STATES PATENT AND TRADEMARK OFFICE
CERTIFICATE OF CORRECTION

| | | |
|---|---|---|
| PATENT NO. | : 8,769,604 B2 | Page 1 of 1 |
| APPLICATION NO. | : 11/434327 | |
| DATED | : July 1, 2014 | |
| INVENTOR(S) | : Buss | |

It is certified that error appears in the above-identified patent and that said Letters Patent is hereby corrected as shown below:

In the Claims

In column 15, line 8, in Claim 7, delete "request;" and insert -- request; and --, therefor.

Signed and Sealed this
Seventh Day of July, 2015

Michelle K. Lee
*Director of the United States Patent and Trademark Office*